Patented Sept. 25, 1945

2,385,335

UNITED STATES PATENT OFFICE 2,385,335

RUBBER VULCANIZATION ACCELERATORS

Russell T. Dean, Stamford, Conn., assignor to American Cyanamid Company, New York, N. Y., a corporation of Maine No Drawing. Application August 19, 1942,
Serial No. 455,359

2 Claims. (Cl. 260—785)

The present invention relates to new condensation products used in the vulcanization of rubber and rubber-like materials. More particularly, the invention relates to rubber vulcanization accelerators obtained by reacting cyanamide, formaldehyde and mercaptoarylthiazoles.

As a typical example, formaldehyde, cyanamide and mercaptobenzothiazole, preferably in molecular ratios of 2:1:2, were reacted in an aqueous medium using a mineral acid such as hydrochloric acid as a condensing agent. Other ratios of reactants may be used although they generally may not be as desirable as that just given.

As illustrative of this invention, but not limiting it thereto, are the following examples.

Example 1

A mixture of the following materials was placed in a 500 cc. three-necked flask equipped with a mercury-seal stirrer, a thermometer and a reflux condenser.

| | | |
|---|---|---|
| Mercaptobenzothiazole (0.2 mol) | grams | 33.4 |
| Cyanamide (90%) (0.4 mol) | do | 18 |
| Formalin (37%) (0.4 mol) | do | 34 |
| Ethyl alcohol (2-B) | cubic centimeters | 200 |
| Concentrated hydrochloric acid | do | 50 |

The temperature was raised to 65° C., at which point a slight exothermic reaction was noted, and held at 65°–70° C. for 20 minutes by intermittent cooling. The mixture was heated to the boiling point and held there for one and one-half hours and then cooled. The precipitate was filtered, washed with a little alcohol followed by a large volume of water and dried in a vacuum desiccator over concentrated sulfuric acid. Thirty grams of product were obtained. Analysis: nitrogen 12.44%; sulfur 31.70%.

Example 2

The following materials were placed in a 500 cc. three-necked flask equipped with a mercury-seal stirrer, a reflux condenser and a thermometer.

| | | |
|---|---|---|
| Mercaptobenzothiazole (0.2 mol) | grams | 33.4 |
| Cyanamide (90%) (0.4 mol) | do | 18 |
| Formalin (37%) (0.4 mol) | do | 34 |
| Water | cubic centimeters | 175 |
| Concentrated hydrochloric acid | do | 30 |

The reaction mixture was rapidly heated to 50° C., at which point a slight exothermic reaction was noted. It was held at 65° C. for 15 minutes and then heated to reflux. After 1.75 hours it was cooled, the precipitate filtered and leached first with 100 cc. of 5 N ammonium hydroxide and then 250 cc. of acetone. After drying in a vacuum desiccator over concentrated sulfuric acid the precipitate weighed 39 grams. Analysis: 13.01% nitrogen; 31.57% sulfur.

Example 3

The following materials were placed in a 500 cc. three-necked flask equipped with a mercury-sealed stirrer, a reflux condenser and a thermometer.

| | | |
|---|---|---|
| Mercaptobenzothiazole (0.2 mol) | grams | 34 |
| Cyanamide (90%) (0.1 mol) | do | 4.5 |
| Formalin (37%) (0.2 mol) | do | 17 |
| Water | cubic centimeters | 200 |
| Concentrated hydrochloric acid | do | 50 |

The mixture was stirred and rapidly heated to 60° C. where a slight exothermic reaction was noted. In 15 minutes more it was brought to the boiling point where it was maintained for a period of two hours, at which time it was rapidly cooled and filtered. The precipitate was leached with 100 cc. of 5 N ammonium hydroxide followed by 250 cc. of acetone. After drying in a vacuum desiccator over concentrated sulfuric acid, the product weighed 30 g. and melted at 231°–232° C. with decomposition. Analysis: Nitrogen 12.45%; sulfur 32.16%.

Example 4

A slurry of 42 g. of crude calcium cyanamide (0.4 mol) and 100 cc. of water was filtered on a Buchner funnel. Concentrated hydrochloric acid was added to the filtrate in such an amount that 50 cc. excess beyond the neutral point was obtained. To this solution there were added 34 grams of mercaptobenzothiazole (0.2 mol) and 25 grams of formalin (37%) (0.30 mol).

The mixture was stirred and heated under reflux for two hours. The product separated as a fine, yellow powder which was filtered and suspended in 200 cc. of water. Sufficient 0.5 N ammonium hydroxide (about 5 cc.) was added to make the solution alkaline to litmus. After five minutes it was still alkaline and was filtered, washed with water and dried in an oven at 63° C. The yield was 43 grams, a little more than the theoretical amount. Analysis: nitrogen 13.55%; sulfur 31.82%.

Example 5

A mixture of 39.4 grams of methylolmercaptobenzothiazole (0.2 mol), 9 grams of 90% cyanamide (0.2 mol), 200 cc. of ethyl alcohol (2-B)

and 50 cc. of concentrated hydrochloric acid was heated and stirred in a 500 cc. round-bottomed flask equipped with a mercury seal stirrer, a reflux condenser and a thermometer. At 60° C. it became homogenous and at 84° C. it began to reflux. After 10 minutes of boiling a precipitate began to form. The solution was refluxed for a period of two hours and then cooled. It was filtered and washed with a little alcohol and a lot of water. After drying in a vacuo over concentrated sulfuric acid 18 grams of product was obtained. Analysis: nitrogen 12.42%; sulfur 31.52%.

Similarly, substituted mercaptobenzothiazoles may be used in place of mercaptobenzothiazole. Illustrative of these compounds are 2-mercapto 6-nitrobenzothiazole; 2-mercapto 6-ethoxybenzothiazole; 2-mercapto 5-chlorobenzothiazole; 2-mercapto 5-nitro-6-chlorobenzothiazole; 6-methylbenzothiazole; 1-mercapto 6-methoxybenzothiazole; 2-mercapto naphthothiazole; and other similarly substituted mercaptobenzo and naphtho thiazoles.

The products obtained as described were incorporated in the usual manner into a rubber stock comprising:

| | Parts by weight |
|---|---|
| Smoked sheets | 100 |
| Zinc oxide | 6 |
| Sulfur | 3 |
| Stearic acid | 1 |
| Accelerator | 1 |

The rubber stocks so obtained were vulcanized by heating for different periods of time at a temperature of 141° C.

| Accelerator as prepared in— | Tensile strength, lbs./sq. inch | |
|---|---|---|
| | 30 minutes cure | 45 minutes cure |
| Example 1 | 3200 | 3070 |
| Example 2 | 2855 | 3265 |
| Example 3 | 2955 | 3295 |
| Example 4 | 3420 | 3800 |
| Example 5 | 2925 | 3385 |

The data set forth above show that the new class of accelerators possess desirable accelerating properties. Moreover, the above uncured stocks showed no set-up or pre-vulcanization as determined by the Williams Plastometer described by Williams in Industrial and Engineering Chemistry for 1924 (16, p. 362; see also Krall, ibid., 16, p. 922) on heating in water at 85° C. for two hours.

While the preferred class of materials may be employed alone as accelerators, their action may be markedly increased by employing therewith organic nitrogen-containing accelerators as activators, such as diphenyl-guanidine, diorthotolylguanidine, the addition product of diorthotolylguanidine and zinc chloride, Shiff's bases, hexamethylene tetramine, etc.

From the above examples, it appears that new condensation products are obtained by reacting molecular proportions of the components as indicated. However, it will be understood that in carrying out the condensation an excess of one or more of the interacting substances may be employed in any way suggested by general practice in synthetic organic chemistry. Accordingly, I do not confine myself to the specific proportions disclosed. Similarly, I may employ such salts as conveniently take the interacting substances into solution but do not confine myself to the specific solvents disclosed.

While I have disclosed certain specific processes employing certain specific substances in definite proportions or amounts, it is to be understood that many changes and modifications of these features will readily appear to those skilled in the art, without departing from the spirit of my invention. Accordingly, my invention is to be limited only by the appended claims, construed as broadly as is permissible in view of the prior art.

I claim:

1. The process which comprises vulcanizing rubber in the presence of sulfur and the condensation product of mercaptobenzothiazole, cyanamide and formaldehyde, in the molecular ratio of 2:1:2, said condensation product having been prepared in an aqueous medium and in the presence of a mineral acid.

2. A vulcanizable rubber composition comprising unvulcanized rubber, sulfur and the condensation product of mercaptobenzothiazole, cyanamide and formaldehyde, in the molecular ratio of 2:1:2, said condensation product having been prepared in an aqueous medium and in the presence of a mineral acid.

RUSSELL T. DEAN.